(12) United States Patent
Igarashi et al.

(10) Patent No.: US 8,286,509 B2
(45) Date of Patent: Oct. 16, 2012

(54) TACTILE SENSOR

(75) Inventors: Hiroshi Igarashi, Tokyo (JP); Ryoji Matsuda, Tokyo (JP)

(73) Assignee: Tokyo Denki University, Tokyo (JP)

( * ) Notice: Subject to any disclaimer, the term of this patent is extended or adjusted under 35 U.S.C. 154(b) by 161 days.

(21) Appl. No.: 12/524,254

(22) PCT Filed: Dec. 21, 2007

(86) PCT No.: PCT/JP2007/074670
§ 371 (c)(1),
(2), (4) Date: Mar. 18, 2010

(87) PCT Pub. No.: WO2008/093480
PCT Pub. Date: Aug. 7, 2008

(65) Prior Publication Data
US 2010/0180697 A1    Jul. 22, 2010

(30) Foreign Application Priority Data
Jan. 29, 2007    (JP) .................. 2007-017747

(51) Int. Cl.
*G01L 1/22* (2006.01)
(52) U.S. Cl. .................. 73/862.627
(58) Field of Classification Search ......... 73/862.627
See application file for complete search history.

(56) References Cited

U.S. PATENT DOCUMENTS

| | | | |
|---|---|---|---|
| 5,753,819 A * | 5/1998 | Rozgo et al. | 73/706 |
| 6,590,777 B2 * | 7/2003 | Morino et al. | 361/736 |
| 6,601,453 B2 * | 8/2003 | Miyazaki et al. | 73/754 |
| 7,360,440 B2 * | 4/2008 | Hirose et al. | 73/777 |

FOREIGN PATENT DOCUMENTS

| | | |
|---|---|---|
| JP | 59-60837 | 4/1984 |
| JP | 62-059825 | 3/1987 |
| JP | 63-113326 | 5/1988 |
| JP | 63-214631 | 9/1988 |
| JP | 06-029808 | 4/1994 |
| JP | 06-058269 | 8/1994 |
| JP | 2004-230532 | 8/2004 |
| JP | 2004-358634 | 12/2004 |

OTHER PUBLICATIONS

International Search Report and Written Opinion for PCT/JP2007/074670, mailed Mar. 18, 2008.
International Preliminary Report on Patentability for PCT/JP2007/074670, issued Aug. 4, 2009.
Kerpa, O. et al., "Development of a Flexible Tactile Sensor System for a Humanoid Robot," Proceedings of the IEEE/RSJ, Intl. Conference on Intelligent Robots and Systems, Oct. 2003.

* cited by examiner

*Primary Examiner* — Lisa Caputo
*Assistant Examiner* — Octavia Davis-Hollington
(74) *Attorney, Agent, or Firm* — Foley & Lardner LLP

(57) ABSTRACT

The present invention provides a tactile sensor which can reproduce a sensor surface in contact with a sensing object and contribute to a reduction in cost of an automation system which utilizes an industrial robot, the tactile sensor including: a contact-portion unit 12 composed of a flexible material; a contact-portion housing unit 11 which surrounds and houses the contact-portion unit in a removable state while forming a posture so that a top portion of the contact-portion unit may project; and a strain sensing element 15 or a pressure sensing element embedded into the contact-portion housing unit.

20 Claims, 5 Drawing Sheets

TACTILE SENSOR

CROSS-REFERENCE TO RELATED APPLICATIONS

The present application is a U.S. national stage application claiming the benefit of International Application No. PCT/JP2007/074670, filed on Dec. 21, 2007, which claims the benefit of Japanese Application No. 2007-017747, filed on Jan. 1, 2007, the entire contents of which are incorporated herein by reference in their entireties.

TECHNICAL FIELD

The present invention relates to a tactile sensor.

BACKGROUND ART

In recent years, imposing menial work, heavy labor work, dangerous work, and work in adverse environments on industrial robots instead of human beings has been actively performed. The work carried out by this robot usually treats only fixed objects.

For that reason, development of industrial robots which can do more advanced and complicated work with respect to various objects like human beings has been expected, and researches using vision sensors or tactile sensors have been actively conducted at present. The focus of the researches is to achieve that detection of force or slip can be carried out using visual sensors or tactile sensors in order for robots to be able to exactly grip complicated-shaped objects (soft objects, objects with complicated shape, or the like) without breaking or slipping out the same.

As vision sensors used for noncontact vision sensors, existing cameras, laser scanners, or the like are put into practical use in the industrial robots in order to detect a position of a sensing object. However, these vision sensors can only detect rough position information on the object, and in addition to that, a dead angle due to the object or the robot itself poses a problem, thus they are insufficient as a sensor device that provides information required for the exact grip of the robot.

Generally, tactile sensors can obtain "more detailed information on applied force and unevenness of the object" required for the exact grip by incorporating strain gages, semiconductor pressure sensitive devices, or the like which are existing force sensors and making them directly contact to the object surface.

However, in the case of the conventional tactile sensor such as a tactile sensor described in, for example, Japanese Unexamined Patent Application Publication (Kokai) No. 2004-358634 (Patent Document 1), since the outer skin of the flexible silicone rubber is provided in the surface, wear and degradation of the sensor surface due to contact are serious, it cannot be used continuously unless human beings specially exchange the degraded main part or surface of the tactile sensor frequently, and there is a problem that personal costs may increase, so that it has not been put into practical use as industrial use. In addition, that the focus of the current tactile sensor researches is directed to the development of new devices so as to enhance sensing capabilities is also a reason why the practical application has not been achieved.

Meanwhile, a tactile sensor is one of the elements required to make a robot perform operations of the complicated-shaped objects and soft objects that only human beings could do until now. As one of the extensive applications of this tactile sensor, there is an industrial robot system utilized in a recycling system which automates the work of separating the garbage.

Circulation of resources based on recycling is one of critical issues in the industry at present, but when recycling work is done by human beings putting it on an operating base poses a difficult problem in consideration labor costs and safety. Accordingly, when considering making the industrial robot work the separation work of the garbage in the automated recycling system, it can be assumed the work of performing the separation in which the robot is made to find the specific garbage among various types of garbage using a simple image processing and to pick it up. In such an application, although it is possible to make the industrial robot find out the specific garbage, the work to exactly pick up the garbage with various shapes has been a technically difficult problem in the conventional technologies.

[Patent Document 1] Japanese Unexamined Patent Application Publication (Kokai) No. 2004-358634

SUMMARY

The present invention is made in view of conventional technological problems described above, and an object thereof is to provide a tactile sensor capable of reconstructing a sensor surface in contact with sensing objects and contributing to a reduction in cost of the automation system which utilizes the industrial robot.

Additionally, an object of the present invention is to provide a tactile sensor that makes it possible to exactly pick up a grip object with various shapes by the industrial robot, by being attached to a grip hand of the same robot.

Moreover, an object of the present invention is to provide a tactile sensor that can arbitrarily create the most suitable surface shape according to a sensing object, and reconstruct the surface to thereby maximize ability of detection.

One feature of the present invention is a tactile sensor, provided with: a contact-portion unit composed of a flexible material; a contact-portion housing unit which surrounds and houses the contact-portion unit in a removable state while forming a posture so that a top portion of the contact-portion unit may project; and a strain sensing element or a pressure sensing element embedded into the contact-portion housing unit.

In the tactile sensor of the aforementioned invention, the contact-portion housing unit may house a plurality of contact-portion units.

In the tactile sensor of the aforementioned invention, the flexible material of the contact-portion unit may be a silicone material.

Another feature of the present invention is a tactile sensor, provided with: a contact-portion unit composed of a silicone material; a contact-portion housing unit which surrounds and houses the contact-portion unit while forming a posture so that a top portion of the contact-portion unit may project; and a strain sensing element or a pressure sensing element embedded into the contact-portion housing unit, wherein the silicone material is a two-liquid type of a silicone base-resin and a sub-resin that hardens the material by being mixed therein, an injection tube for injecting the silicone base-resin into the bottom of the contact-portion unit from the bottom of the contact-portion housing unit is provided, and re-injection of the silicone base-resin is enabled through the injection tube.

In the tactile sensor of the aforementioned invention, the silicone material is a heat-hardened type replaced with the two-liquid type, an injection tube for injecting an unhardened silicone into the bottom of the contact-portion unit from the bottom of the contact-portion housing unit is provided, and re-injection of the unhardened silicone is enabled through the injection tube.

In the tactile sensor of the aforementioned invention, the contact-portion housing unit may house a plurality of contact-portion units.

According to the tactile sensor of the present invention, since the contact-portion unit is housed in the contact-portion housing unit in an exchangeable state, the sensor surface in contact with the sensing object can be reconstructed only by exchanging this contact-portion unit, thereby making it possible to contribute to the reduction in cost of the automation system which utilizes the industrial robot. Additionally, according to the tactile sensor of the present invention, since the contact-portion unit is composed of the flexible material, it is possible to exactly pick up a grip object with various shapes by the industrial robot, by being attached to a grip hand of the same robot. Moreover, according to the tactile sensor of the present invention, it is possible to arbitrarily create the most suitable surface shape according to the sensing object, and to exchange it to a new one, so that ability of detection can be maximized and it can also be used continuously for a long time.

Additionally, according to the tactile sensor of the present invention, a two-liquid type of the silicone base-resin and the sub-resin that hardens the material by being mixed therein is used as the silicone material of the contact-portion unit, an injection tube for injecting the silicone base-resin into the bottom of the contact-portion unit from the bottom of the contact-portion housing unit is provided, and re-injection of the silicone base-resin is enabled through the injection tube, so that by a method in which the top portion of the contact-portion unit which has been worn out or dirty by using the sensor is cut off, the top portion is reproduced into a projected shape by re-injecting the silicone base-resin from the backside, and the sub-resin is injected into the silicone base-resin to harden it, the contact-portion unit can be reproduced into the original shape and state. Hence, according to the tactile sensor of the present invention, the sensor surface of the contact-portion unit in contact with the sensing object can be reproduced, thereby making it possible to contribute to the reduction in cost of the automation system which utilizes the industrial robot. Additionally, according to the tactile sensor of the present invention, since the contact-portion unit is composed of the silicone material, attaching it to the grip hand of the industrial robot makes it possible to exactly pick up the grip object with various shapes by the same robot. Moreover, according to the tactile sensor of the present invention, it is possible to arbitrarily create the most suitable surface shape easily according to the sensing object and to reproduce a new one, so that ability of detection can be maximized and it can also be used continuously for a long time.

DETAILED DESCRIPTION

Hereinafter, embodiments of the present invention will be described in full detail based on the drawings.

First Embodiment

Figure 1:
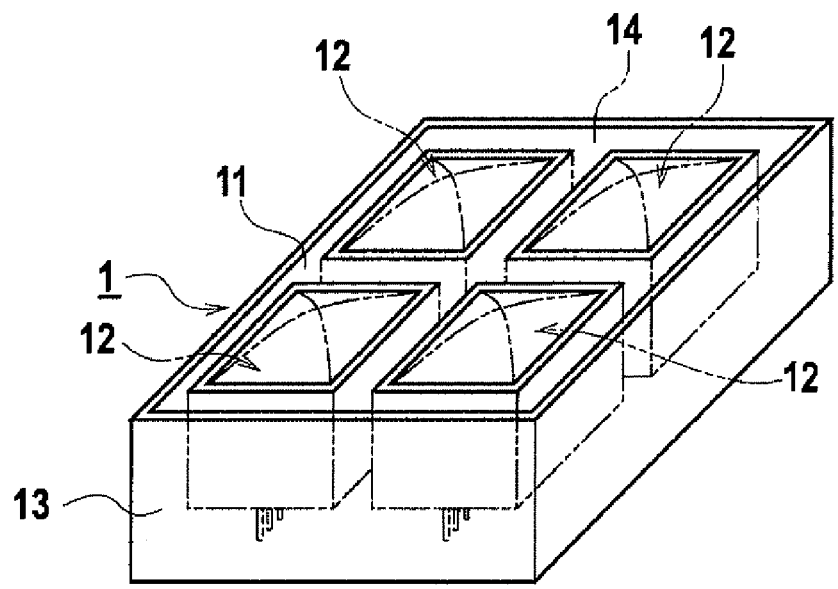
FIG. 1 is a perspective view of a tactile sensor according to a first embodiment of the present invention.
Figure 2:
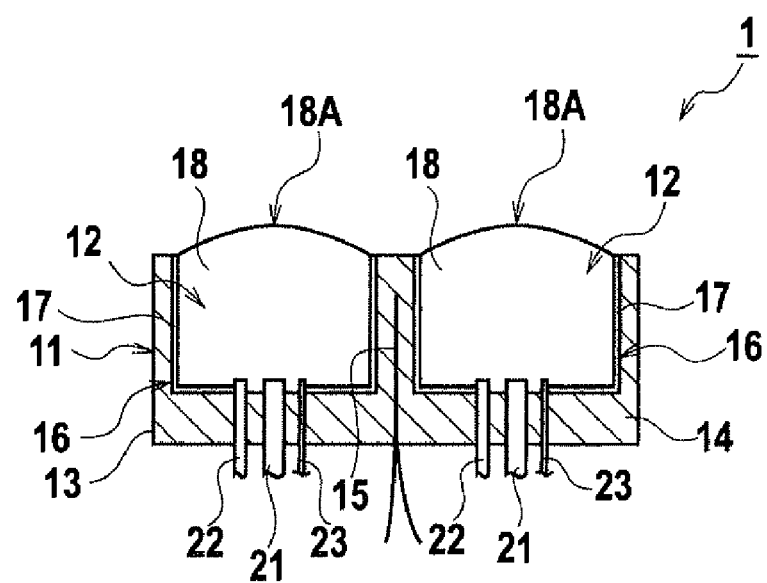
FIG. 2 is a sectional view of the tactile sensor according to the aforementioned embodiment.
Figure 3:
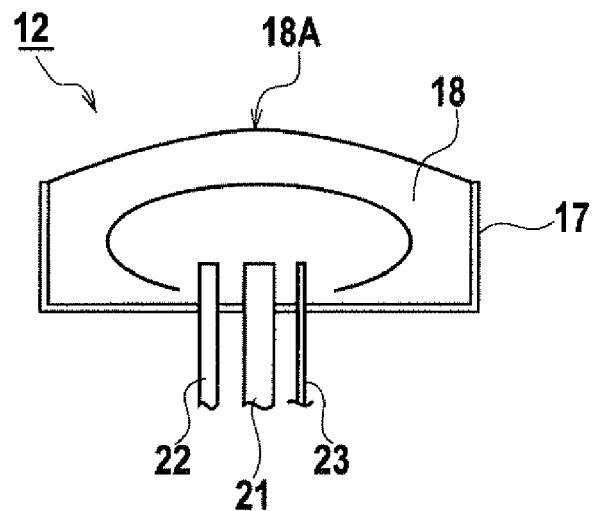
FIG. 3 is a sectional view of a part of a contact-portion unit in the tactile sensor according to the aforementioned embodiment.

A surface reproduction type tactile sensor according to a first embodiment of the present invention will be described. The tactile sensor 1 according to the present embodiment shown in FIG. 1 through FIG. 3 is constituted by a sensing unit 11 for detecting force and slipping, and a plurality of contact-portion unit 12 with a reproducible surface arranged within the sensing unit 11.

In the sensing unit 11, a flexible material 14, such as a silicone or urethane resin or the like is stuffed in an outer case 13 except for a corresponding portion for housing the contact-portion unit 12, and one or a plurality of force sensing elements 15 such as strain sensing elements or pressure-sensitive sensing elements are embedded into this flexible material 14 in a suitable direction, namely, a posture to be able to accurately sense external force.

One or a plurality of force sensing elements 15 are embedded thereinto in order to detect the force and slipping due to the contact with the sensing object, and in a posture that strain gage having characteristics capable of following a rapid stress change can sense force in each direction. Each sensing element 15 is pasted on a thin metal plate, and is embedded inside the flexible material 14. As the sensing element 15, a pressure-sensitive distribution sensing element such as, for example, FLA-2-11 made by Tokyo Sokki Kenkyujo Co., Ltd., a small strain gage made by Kyowa Electronic Instruments Co., Ltd., or a tactile sensor system made by Nitta Corporation, is employed.

The contact-portion unit 12 is constituted in such a way that thin metallic enclosures 17 are inserted in concave portions 16 formed in the sensing unit 11, respectively, and a silicone is filled therein as a contact member 18. In order to centralize degradation (wear and contamination) of the sensor surface due to contact with the objects, a surface central portion 18A of this contact member 18 is formed so as to be externally convex by about 1 to 2 millimeters with respect to a portion of the sensing unit 11. A silicone base-resin injection tube 21, a sub-resin injection tube 22, and an optical fiber 23 are connected to the bottom of the enclosure 17 of the contact-portion unit 12.

In order to obtain proper frictional force in contact with the sensing object, a flexible material having elasticity is suitable for the contact member 18, which also needs to be a material to be easily reproduced, and thus a silicone material which is cheap and easy to be treated, has durability and chemical resistance, and also has proper elastic force is used in the present embodiment. In the case of the present embodiment, a two-liquid type is employed as the silicone of the contact member 18, and a silicone base-resin is injected into the enclosure 17 from the silicone base-resin injection tube 21 and a sub-resin is injected into the enclosure 17 from the sub-resin injection tube 22, so that the silicone is hardened by mixing these base-resin and sub-resin with each other. As the two-liquid type silicone, a silicone made by Wacker Asahikasei Silicone Co., Ltd., in which the base-resin is ELASTOSIL M8520 and the sub-resin which is a hardening agent is Catalyst T40 may be employed, for example.

As will be hereinbelow described, when the surface of the contact member 18 of the contact-portion unit 12 is degraded by use of the present tactile sensor 1, it is reproduced by cutting off the surface central portion 18A up to the same height as the enclosure 17, re-injecting the silicone base-resin from the silicone base-resin injection tube 21 and the sub-resin from the sub-resin injection tube 22 into the enclosure 17, pushing out the surface central portion 18A of the flexible contact member 18 by the force of the backside injected liquid resins until it grows up to a state of an externally convex shape as shown in FIG. 3, and hardening them by mixing the base-resin and the sub-resin with each other in that state.

Figure 4:
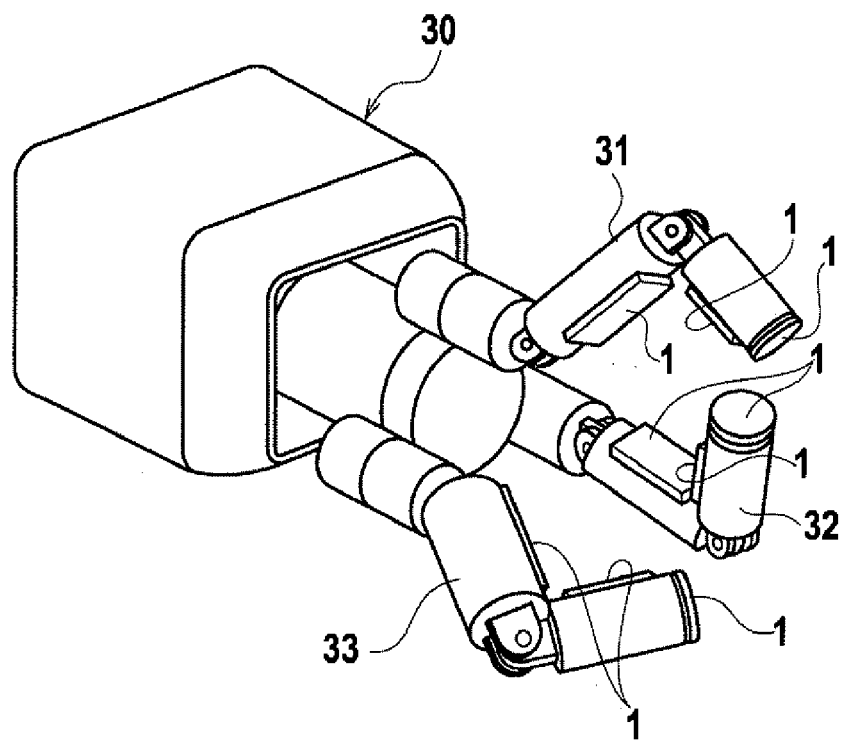
FIG. 4 is a perspective view of a robot hand to which the tactile sensor according to the aforementioned embodiment is attached.

FIG. 4 shows a state where the tactile sensors 1 according to the present embodiment are attached to proper positions of a robot hand 30 of the industrial robot. The tactile sensors 1 according to the present embodiment are attached to finger pad portions and finger tip portions of respective fingers 31 to 33 of the robot hand 30. When making the robot hand 30 grip the object, respective tactile sensors 1 which are attached to each of fingers 31 to 33 contact on the surface of the object to thereby output stress based on pressure and slipping. Consequently, it is possible to control a bend angle and a grip force of each finger to thereby make it grip the object with a force of proper strength based on this sensing signal.

Figure 5:
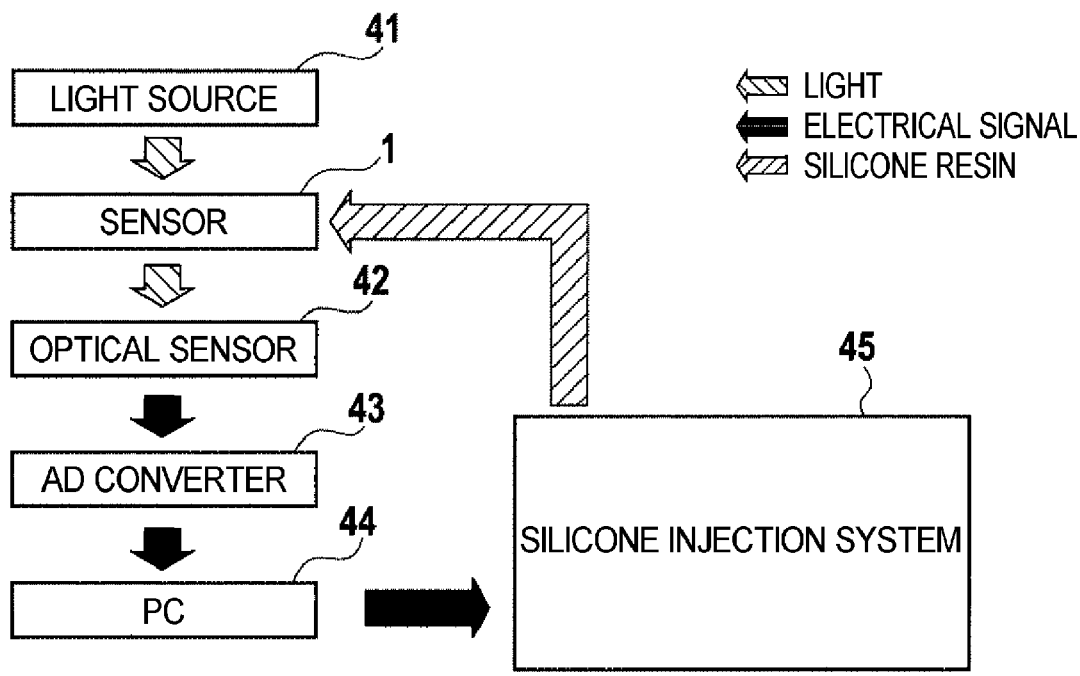
FIG. 5 is a flow chart of a reproducing method of a contact-portion unit of the tactile sensor according to the aforementioned embodiment.

When the surface of the contact member 18 of the contact-portion unit 12 is degraded by using this tactile sensor 1 while attaching it to the robot hand 30, it is reproduced. This reproducing method of the surface will be described using FIG. 5. The reproduction of the surface of the contact member 18 is performed by three steps of detecting degradation of the sensor surface, removing the degraded surface, and reproducing the surface.

When detecting the degradation of the tactile sensor 1 attached to the robot after the work of it, the sensor 1 is moved under a light source 41. Thereby, light from the light source 41 is transmitted to an external optical sensor (photo IC) 42 through the degradation of the surface (wear and contamination), the semi-transparent silicone contact member 18, and the optical fiber 23. Signals from the optical sensor 42 are converted into digital signals by an AD converter 43 and a computer 44 determines the degree of degradation based on the converted signals. At this time, a brightness value according to thickness and contamination of the semi-transparent silicone is determined using a change of transmittance.

Next, if there is the degradation to a level requiring the reproduction, the surface central portion 18A of the contact member 18 is cut off and removed.

Lastly, in order to return the surface central portion 18A of the contact member 18 to the original shape, the aforementioned two-liquid type silicone is re-injected by an externally installed injection system 45. While the two-liquid type silicones chemical-react to thereby be hardened only when the base-resin and the hardening agent are mixed with each other, it remains in a liquid state in the base-resin injection tube 21 even though it is left as it is for a long time as compared with a one-liquid type silicone that is hardened by drying, and thus there is an advantage not to be hardened. The re-injection of the silicone is performed until a brightness value after the re-injection is coincident with the recorded brightness value before the sensor surface degradation. This makes it possible to appropriately adjust a re-injection amount of silicone and to reconstruct a physical shape of the sensor surface to an initial state, thus preventing a change of sensor characteristics.

According to the tactile sensor 1 of the present embodiment, by the method in which two-liquid type of the silicone base-resin and the sub-resin that hardens the material by being mixed therein is used as the silicone material of the contact-portion unit 12, the top portion of the contact member 18 of the contact-portion unit 12 which has been worn out or dirty by using the sensor is cut off, the silicone base-resin is re-injected from the bottom of the unit to thereby reproduce the surface central portion 18A of the contact member 18 so as to be the externally convex shape, and the sub-resin is injected into the silicone base-resin to harden it, the contact-portion unit 12 can be reproduced into the original shape and state, so that the sensor surface of the contact-portion unit in contact with the sensing object can be reproduced, thereby making it possible to contribute to a reduction in cost of the automation system which utilizes the industrial robot. In addition, according to the tactile sensor 1 of the present embodiment, since the contact-portion unit 12 is composed of the silicone material, attaching it to the grip hand of the industrial robot makes it possible to exactly pick up the grip object with various shapes by the same robot. Moreover, according to the tactile sensor 1 of the present embodiment, it is possible to arbitrarily create the most suitable surface shape easily according to the sensing object and to reproduce a new one, so that ability of detection can be maximized and it can also be used continuously for a long time.

Second Embodiment

Figure 6:
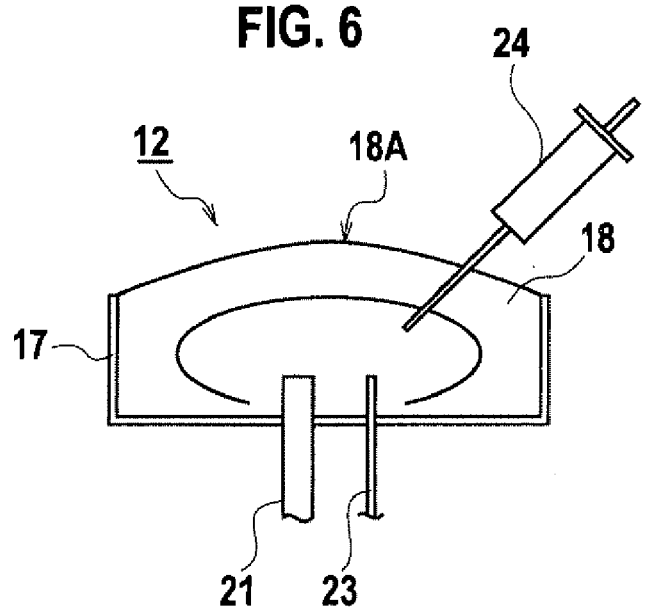
FIG. 6 is a sectional view of a part of a contact-portion unit employed by a tactile sensor according to a second embodiment of the present invention.

A tactile sensor according to a second embodiment of the present invention will be described using FIG. 6. Features of the present embodiment are in a hardening method of the contact member 18 in the contact-portion unit 12. Namely, as a mechanism of re-injecting and hardening the silicone which constitutes the contact member 18, there is employed a method in which although the silicone base-resin is re-injected from the base-resin injection tube 21 connected to the bottom of the enclosure 17 in a manner similar to that of the first embodiment, the sub-resin which is a hardening agent is directly injected into the contact member 18 from the front side by an injector 24 after re-injecting a proper amount of silicone base-resin, and the two liquids are mixed with each other to thereby be hardened.

The operations and effects similar to those in the first embodiment are obtained also in the present embodiment, and further, since the sub-resin is to be directly re-injected, the sub-resin injection tube can be eliminated from the bottom of the enclosure 17, so that there is also an advantage to achieve a reduction in size of the sensor.

Third Embodiment

A tactile sensor 1A according to a third embodiment of the present invention will be described using FIG. 7 through FIG. 9. The tactile sensor 1A according to the present embodiment is characterized by a configuration in which a contact-portion unit 12A composed of a flexible material, such as a silicone or urethane resin is housed in the sensing unit 11A in an exchangeable state.

Figure 7:
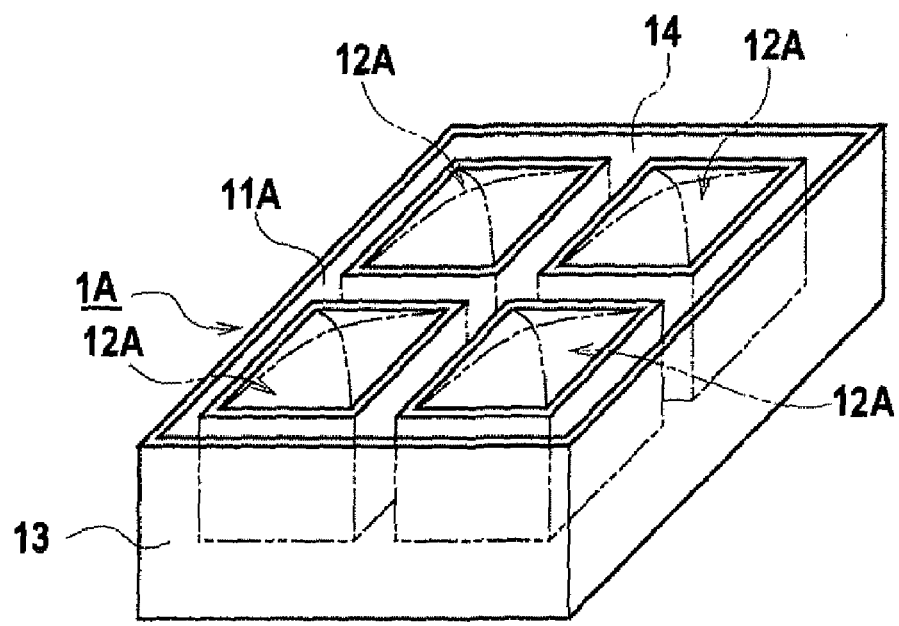
FIG. 7 is a perspective view of a tactile sensor according to a third embodiment of the present invention.
Figure 8:
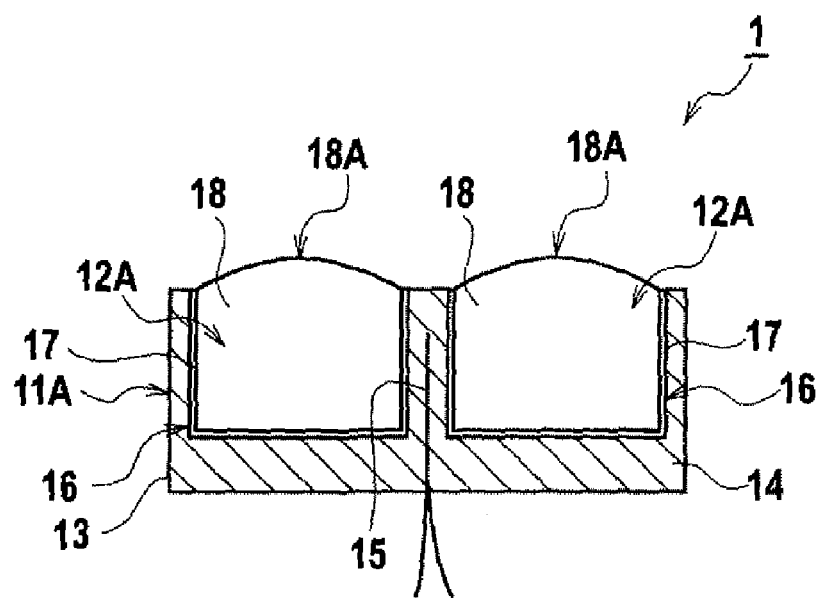
FIG. 8 is a sectional view of the tactile sensor according to the aforementioned embodiment.

As shown in FIG. 7 and FIG. 8, the sensing unit 11A has a configuration similar to that of the first embodiment, wherein the flexible material 14, such as a silicone or urethane resin or the like is stuffed in the outer case 13 except for the corresponding portion for housing the contact-portion unit 12A, and one or a plurality of force sensing elements 15 such as strain sensing elements or pressure-sensitive sensing elements are embedded into this flexible material 14 in a suitable direction, namely, a posture to be able to accurately sense external force.

Figure 9:
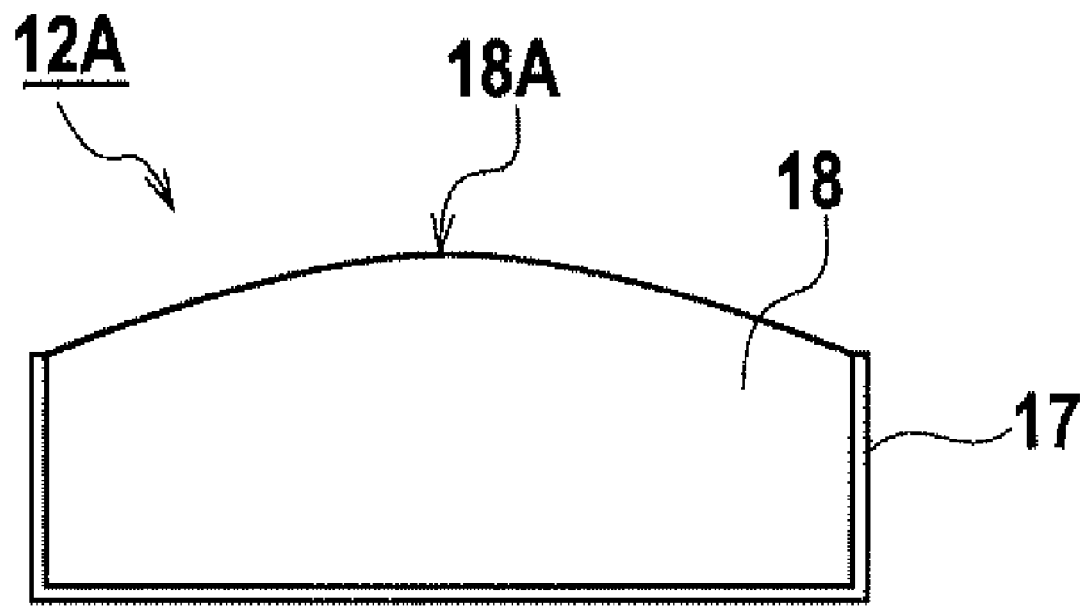
FIG. 9 is a sectional view of a part of a contact-portion unit in the tactile sensor according to the aforementioned embodiment.

The contact-portion unit 12A has a configuration in which the silicone is filled into the thin metallic enclosure 17 as the contact member 18 as shown in FIG. 9 in detail. In order to centralize degradation (wear and contamination) of the sensor surface due to contact with the objects, the surface central portion 18A of this contact member 18 is formed so as to be externally convex by about 1 to 2 millimeters with respect to a portion of the sensing unit 11A. The contact-portion units 12A are then housed in concave portions 16 formed in the sensing unit 11A in an exchangeable state, respectively. Although the material of the contact member 18 will not be limited in particular as far as it is a flexible material, a material having a certain amount of flexibility, such as the aforementioned silicone or urethane resin is suitable for it.

An example of use of the tactile sensor 1A of the present embodiment is a configuration shown in FIG. 4 similar to that of the first embodiment. When the surface of the contact member 18 of the contact-portion unit 12A is degraded by using this tactile sensor 1A while attaching it to the robot hand 30, all of the contact-portion units 12A are taken out from the sensing unit 11A and are exchanged to new units that are then attached thereto, so that it is reconstructed.

As a result of this, according to the tactile sensor 1A of the present embodiment, since the contact-portion units 12A are housed in the sensing unit 11A in an exchangeable state, the sensor surfaces in contact with the sensing object can be reconstructed only by exchanging the contact-portion units 12A, thereby making it possible to contribute to the reduction in cost of the automation system which utilizes the industrial robot. In addition, according to the tactile sensor 1A of the present embodiment, since the contact-portion unit 12A is composed of the flexible material, attaching it to the grip hand of the industrial robot makes it possible to exactly pick up the grip object with various shapes by the same robot. Moreover, according to the tactile sensor 1A of the present embodiment, it is possible to arbitrarily create the most suitable surface shape according to the sensing object and to exchange it to a new one, so that ability of detection can be maximized and it can also be used continuously for a long time.

The invention claimed is:

1. A tactile sensor comprising:
    a contact-portion unit composed of a flexible material;
    a contact-portion housing unit which surrounds and houses the contact-portion unit in a removable state while forming a posture so that a top portion of the contact-portion unit may project;
    an injection tube projecting through the contact-portion housing unit to permit injection of unhardened flexible material into the contact-portion unit; and
    a strain sensing element or a pressure sensing element embedded into the contact-portion housing unit.

2. The tactile sensor according to claim 1, wherein the contact-portion housing unit houses a plurality of contact-portion units.

3. The tactile sensor according to claim 1, wherein the flexible material of the contact-portion unit is a silicone material.

4. The tactile sensor according to claim 1, wherein the flexible material comprises at least one of silicone and urethane.

5. The tactile sensor according to claim 1, wherein the top portion of the contact portion unit has a convex surface that projects from the contact portion housing unit.

6. The tactile sensor according to claim 1, wherein the top portion defines a surface central portion about one millimeter to about two millimeters from the strain sensing element or the pressure sensing element.

7. The tactile sensor according to claim 1, wherein the injection tube projects through a bottom of the contact-portion housing unit.

8. The tactile sensor according to claim 1, wherein the injection tube is a first injection tube and the unhardened flexible material includes a base resin, and further comprising:
    a second injection tube projecting through the contact-portion housing unit to permit injection of a sub-resin into the contact-portion unit.

9. The tactile sensor according to claim 1, further comprising:
    an optical fiber extending into at least a portion of the contact portion unit to receive light propagating toward or through the contact portion unit;
    an optical sensor operably coupled to the optical fiber to detect the light received by the optical fiber; and
    a processor communicatively coupled to the optical sensor to determine a thickness of the contact portion unit based on light detected by the optical sensor.

10. The tactile sensor according to claim 1, wherein the tactile sensor is disposed on a manipulating member of a robot.

11. A tactile sensor comprising:
    a contact-portion unit composed of a silicone material;
    a contact-portion housing unit which surrounds and houses the contact-portion unit while forming a posture so that a top portion of the contact-portion unit may project; and
    a strain sensing element or a pressure sensing element embedded into the contact-portion housing unit,
    wherein the silicone material is a two-liquid type of a silicone base-resin and a sub-resin that hardens the material by being mixed therein, an injection tube for injecting the silicone base-resin into the bottom of the contact-portion unit from the bottom of the contact-portion housing unit is provided, and re-injection of the silicone base-resin is enabled through the injection tube.

12. The tactile sensor according to claim 11, wherein the silicone material is a heat-hardened type which is replaced with the two-liquid type, an injection tube for injecting an unhardened silicone into the bottom of the contact-portion unit from the bottom of the contact-portion housing unit is provided, and re-injection of the unhardened silicone is enabled through the injection tube.

13. The tactile sensor according to claim 11, wherein the contact-portion housing unit houses a plurality of contact-portion units.

14. A method of providing a tactile sensor comprising a contact-portion unit made of flexible material and disposed within a contact-portion housing unit, at least a portion of the contact-portion unit projecting from the contact-portion housing unit, the method comprising:
    injecting unhardened flexible material into the contact-portion housing unit via an injection tube projecting through the contact-portion housing unit; and
    curing the unhardened flexible material to form the flexible material.

15. The method according to claim 14, wherein the flexible material comprises at least one of silicone and urethane.

16. The method according to claim 14, wherein the unhardened flexible material comprises a base resin, and further comprising:
injecting a sub-resin into the contact-portion housing unit via another injection tube projecting through the contact-portion housing unit.

17. The method according to claim 14, wherein the unhardened flexible material comprises a base resin, and further comprising:
injecting a sub-resin into the contact-portion housing unit via the at least a portion of the contact-portion unit projecting from the contact-portion housing unit.

18. The method according to claim 14, further comprising:
detecting light transmitted toward or through at least a portion of the contact-portion unit;
determining a thickness of the contact-portion unit based on the detected light; and
determining an amount of unhardened flexible material to inject into the contact-portion housing unit based on the thickness of the contact-portion unit.

19. The method according to claim 14, further comprising:
placing the at least a portion of the contact-portion unit in contact with an object.

20. The method according to claim 14, further comprising:
sensing a strain or pressure on the contact-portion unit.

* * * * *